US009015724B2

(12) United States Patent
Druyan

(10) Patent No.: US 9,015,724 B2
(45) Date of Patent: Apr. 21, 2015

(54) JOB DISPATCHING WITH SCHEDULER RECORD UPDATES CONTAINING CHARACTERISTICS COMBINATIONS OF JOB CHARACTERISTICS

(75) Inventor: Alexander Druyan, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 1291 days.

(21) Appl. No.: 12/564,964

(22) Filed: Sep. 23, 2009

(65) Prior Publication Data

US 2011/0072437 A1    Mar. 24, 2011

(51) Int. Cl.
G06F 9/46    (2006.01)
G06F 9/50    (2006.01)

(52) U.S. Cl.
CPC ....................................... G06F 9/505 (2013.01)

(58) Field of Classification Search
CPC combination set(s) only.
See application file for complete search history.

(56) References Cited

U.S. PATENT DOCUMENTS

| | | | |
|---|---|---|---|
| 6,112,221 A | 8/2000 | Bender et al. | |
| 6,311,219 B1 | 10/2001 | Factor | |
| 6,374,297 B1 | 4/2002 | Wolf et al. | |
| 6,578,005 B1 | 6/2003 | Lesaint et al. | |
| 6,675,189 B2 | 1/2004 | Rehg et al. | |
| 7,058,946 B2 | 6/2006 | Acharya et al. | |
| 7,082,607 B2 | 7/2006 | Lake et al. | |
| 7,165,252 B1 | 1/2007 | Xu | |
| 7,305,475 B2 | 12/2007 | Tock | |
| 7,441,241 B2* | 10/2008 | Dawson et al. | 718/102 |
| 7,444,638 B1 | 10/2008 | Xu | |
| 7,458,031 B2 | 11/2008 | Aamondt et al. | |
| RE41,705 E * | 9/2010 | Durand et al. | 718/104 |
| 8,131,683 B2* | 3/2012 | Fridrich | 707/661 |
| 8,185,422 B2* | 5/2012 | Yurekli et al. | 705/7.11 |
| 2003/0135621 A1 | 7/2003 | Romagnoli | |
| 2004/0024847 A1 | 2/2004 | Smith | |
| 2006/0070073 A1 | 3/2006 | Maeda et al. | |
| 2007/0074217 A1 | 3/2007 | Rakvic et al. | |
| 2008/0184250 A1* | 7/2008 | Hamadi et al. | 718/104 |
| 2009/0064151 A1 | 3/2009 | Agarwal et al. | |
| 2011/0041136 A1* | 2/2011 | Messier et al. | 718/105 |

OTHER PUBLICATIONS

Dafei Yin-et al.; "Utility Based Query Dissemination in Spatial Data Grid"; INSPEC/IEEE; pp. 559-566; 2008 Summary Only.
Van Reeuwijk-; "Maestro: A Self-Organizing Peer-to-Peer Dataflow Framework Using Reinforcement Learning"; ACM Digital Library; pp. 187-200; Jun. 11-13, 2009.
Forman-et al.; "Scaling Up Text Classification for Large File Systems"; ACM Digital Library: pp. 239-252; Aug. 24-27, 2008.

* cited by examiner

*Primary Examiner* — Eric C Wai
(74) *Attorney, Agent, or Firm* — Thomas E. Tyson; Parashos Kalaitzis

(57) ABSTRACT

The present invention provides a method, program product, and information processing system that efficiently dispatches jobs from a job queue. The jobs are dispatched to the computational nodes in the system. First, for each job, the number of nodes required to perform the job and the required computational resources for each of these nodes are determined. Then, for each node required, a node is selected to determine whether a job scheduler has a record indicating if this node meets the required computational resource requirement. If no record exists, the job scheduler analyzes whether the node meets the computational resource requirements given that other jobs may be currently executing on that node. The result of this determination is recorded. If the node does meet the computational resource requirement, the node is assigned to the job. If the node does not meet the resource requirement, a next available node is selected. The method continues until all required nodes are assigned and the job is dispatched to the assigned nodes. Alternatively, if the number of required nodes is not available, it is indicated the job can not be run at this time.

11 Claims, 4 Drawing Sheets

JOB DISPATCHING WITH SCHEDULER RECORD UPDATES CONTAINING CHARACTERISTICS COMBINATIONS OF JOB CHARACTERISTICS

BACKGROUND OF THE INVENTION

1. Technical Field

The present invention relates to computer job management on a supercomputer. In particular, the present invention relates to efficiently dispatching computer jobs to computation elements or nodes of a supercomputer.

2. Description of the Related Art

Early computers would process a single program or computer job one program or job at a time since such computers consisted of a single central processing unit (cpu). As technology progressed, computers began to include multiple CPU's to increase computational capability.

Modern supercomputers include many computational elements or computational nodes where each computational node includes one or more CPUs and other computational resources such as memory of varying sizes, network connections involving network adapters, and other special-purpose computational hardware and software. These computational nodes provide the capability to execute many computational tasks at the same time making possible the execution of several jobs simultaneously across the numerous computational nodes. Job scheduling is the task of determining which computational nodes are available for the execution of the job. On these supercomputers, scheduling computer jobs is becoming more difficult because of the increasing number of computational nodes, the increasing complexity of these nodes and the increasing complexity of the computer jobs.

SUMMARY

In accordance with the present invention, a method for dispatching computer jobs from a computer job queue in an information processing system is provided. This information processing system includes several computational nodes that are assigned to execute jobs. The method includes the steps of, for each job, determining a number of nodes required and computational resource requirements of these nodes. For each computational resource requirement, selecting a node and determining from a record whether the node has the necessary computational resources to meet the computational resource requirement. If no such record exists, a determination is made as to whether or not the node has the necessary computational resources to meet the requirement and recording this determination. Then the node is assigned to the job if the job's computational resource requirements for the node (defined as the job characteristic) are met or, if the job's computational resource requirements are not met, selecting the next available node for analysis. Then, it is determined if the required number of nodes are met. If so, the job is dispatched to the assigned nodes for execution. If not, the job is designated as not being able to be run at this time.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
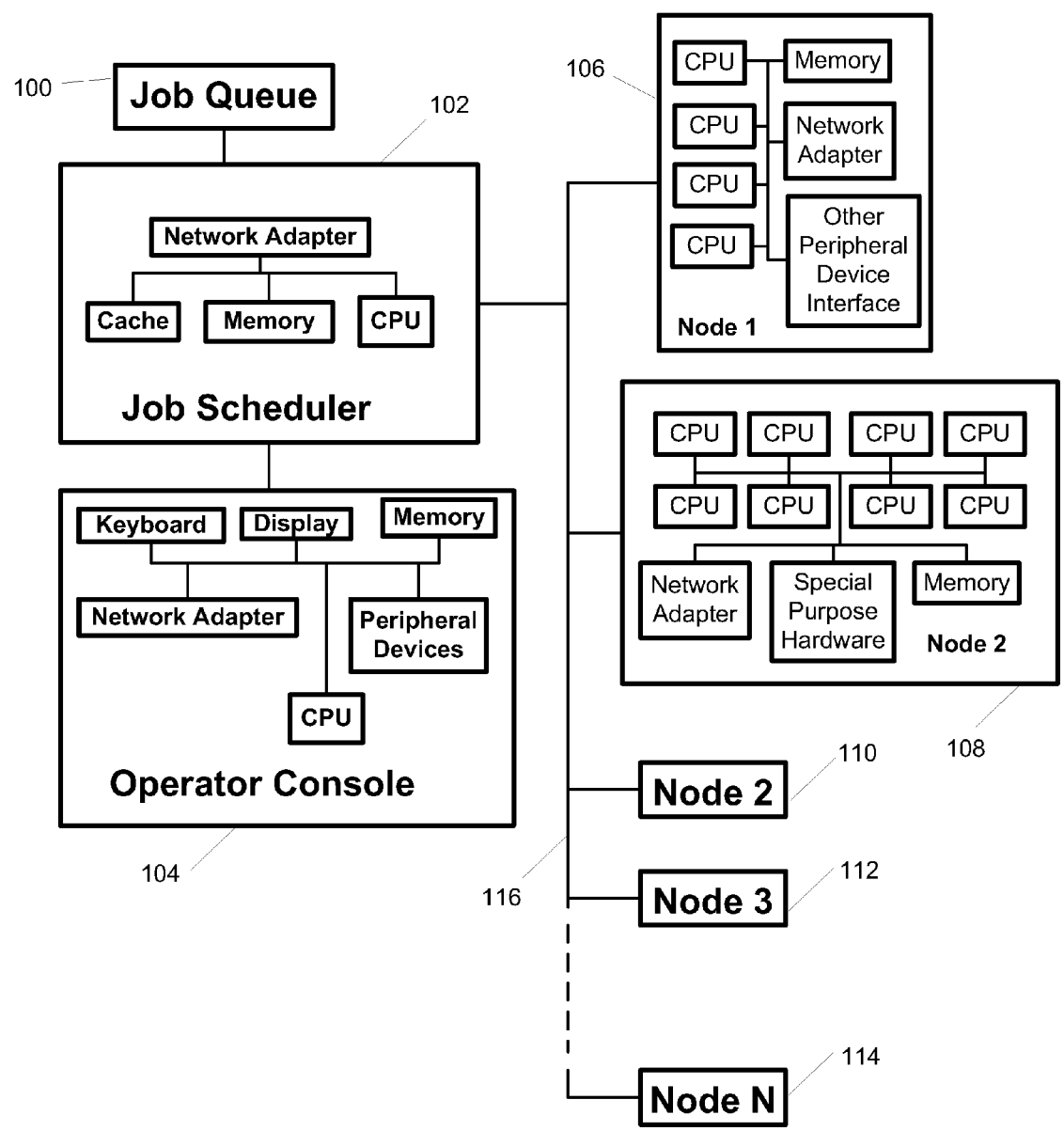
FIG. 1 is a block diagram of an information processing system illustrating a job scheduler, a job queue and operator console connected to several computational nodes.

The following is intended to provide a detailed description of an example of the invention and should not be taken to be limiting of the invention itself. Rather, any number of variations may fall within the scope of the invention, which is defined in the claims following the description.

The present invention is a method, system, and computer program product that provides for the selecting of computational nodes and the dispatching of jobs to those selected computational nodes to perform the job.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram of an information processing system. The system illustrated is typical of the system that would use the invention. In FIG. 1, a number of jobs are stored in a job queue 100. A job scheduler 102 is connected to the job queue 100 to access each job and assign a job to several different nodes illustrated as nodes 106, 108, 110, 112 and 114. After the nodes are assigned to a job, the job is then dispatched to the nodes for execution. It should also be understood that some of the nodes may, at the time the job is being dispatched, be executing other jobs. Therefore, when examining the nodes, the job scheduler 102 must determine whether or not the node has enough computational resources available for the job taking into account the computational resources that are consumed by other jobs executing on this node.

In one embodiment, the job scheduler 102 can be a stand-alone processor with a single CPU, network adapter, cache and other memory connected to a job queue 100 which stores the jobs to be executed. Additionally, an operator console 104 is connected to the job scheduler 102. The operator console 104 may include, for example, a keyboard, display, a memory, a network adapter and even peripheral devices that would enable a human operator to interface to the job scheduler 102. The job scheduler 102 is connected to a network 116 which is connected to the several nodes 106, 108, 110, 112 and 114. It should be understood that while these nodes can have similar computer resources, some nodes may be unique in that they contain special-purpose hardware or software providing special capabilities. Thus the job scheduler must include these special-purpose capabilities in the node selection process.

Jobs may be received in many ways including through data transferred to the job scheduler 102 or through the operator console 104. It should be apparent that for an information processing system with a large number of nodes and a large number of jobs, the assignment of nodes to jobs can become very complicated and time consuming adversely affecting the information processing system efficiency.

The present invention provides an efficient solution for determining available nodes to be assigned to a job, given that some of these nodes are already executing other jobs.

Figure 2:
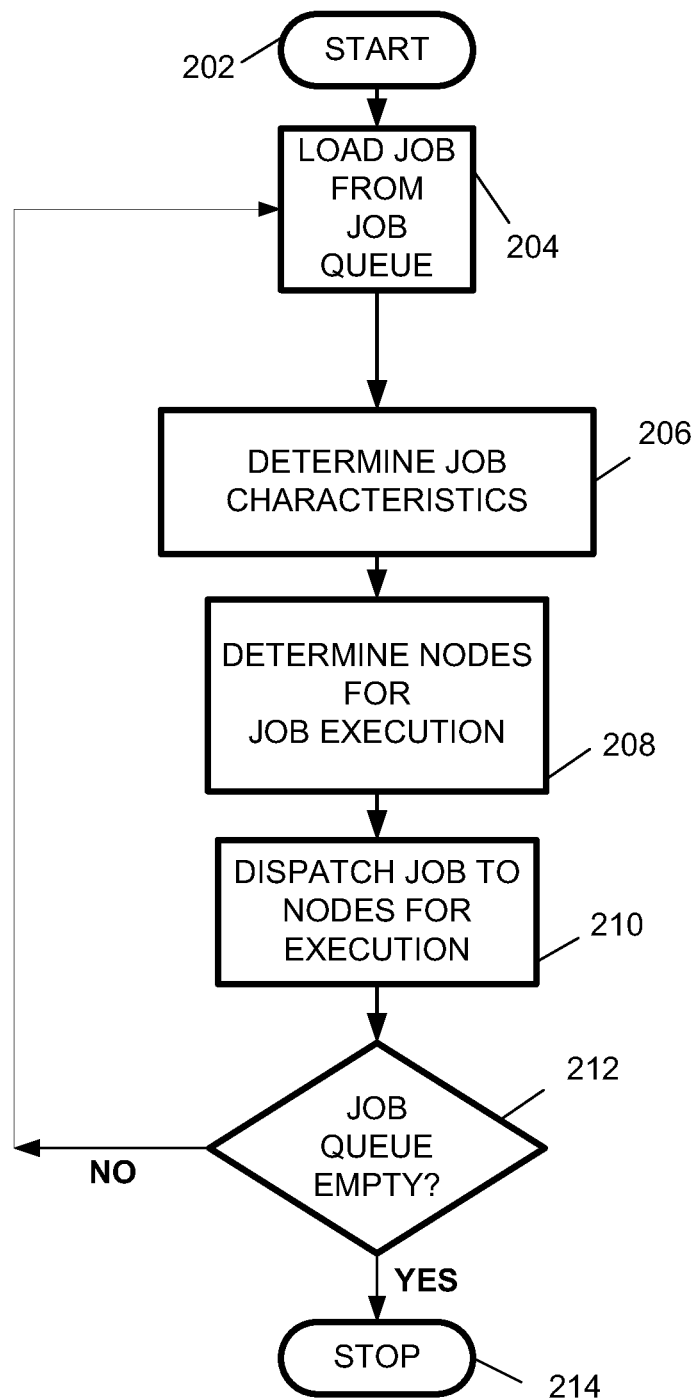
FIG. 2 is a flow chart illustrating the function of dispatching jobs from the job queue to the computational nodes.

Referring now to FIG. 2, a flowchart illustrates a top functional view of the job scheduling and dispatching process. At the start of the process in step 202, the job scheduler 102 will load a job from the job queue 100 in step 204. Then, in step 206, the job scheduler 102 determines the number of nodes required by the job and the computational resource requirements for each node necessary for execution of the job. The computational resource requirements for each node are defined as the job characteristic. Such requirements may include the number of CPUs required in a node, the amount of memory required, special-purpose hardware required such as network adapters, and any other special resources required. While only a few of these computational requirements have been listed, it should be understood that for computational nodes, that many types of different computational resources may be available.

Next, in step 208, the job scheduler 102 determines which nodes will be assigned to the job for job execution. Then, in step 210, the job is dispatched to these assigned nodes for execution. The job scheduler 102, in decision step 212, determines if the job queue 100 is empty. If not, the next job is loaded in step 204 and the process continues. However, if the job queue 100 is empty then the job scheduler 102 stops in step 214.

Figure 3:
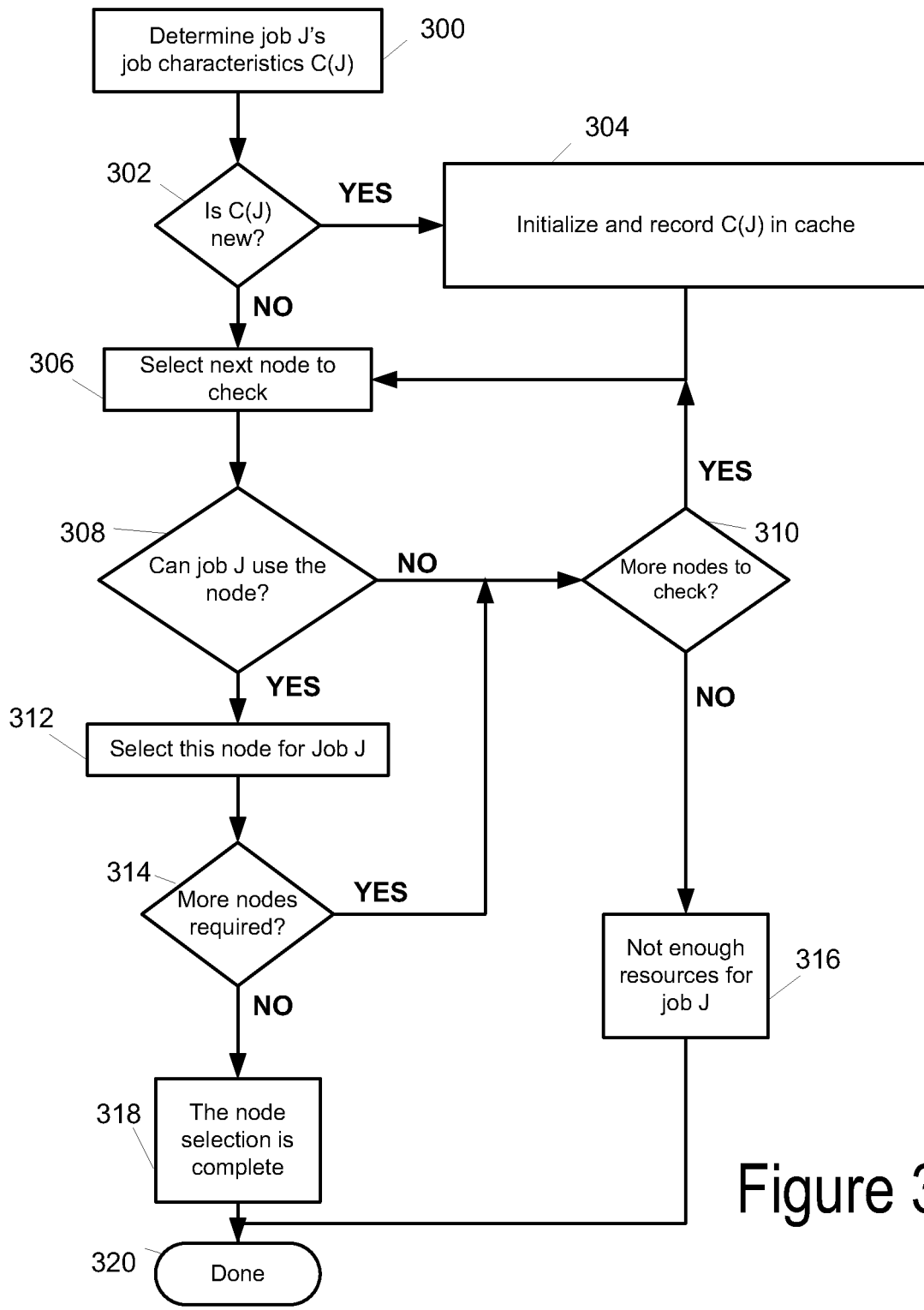
FIG. 3 a flow chart illustrating the function of determining job characteristics and selecting computational nodes.

FIG. 3 is a flowchart that illustrates the application of job characteristics in the node selection process. The operations that are illustrated in FIG. 3 are a more detailed description of steps 206 and 208 in FIG. 2. Returning to FIG. 3, in step 300, the job scheduler 102 determines the number of nodes required by the job for execution and the job characteristic. When a job is loaded from the job queue, this number of required nodes and the job characteristic are included for each job. As explained previously, the job characteristic is the required node computational resources In step 302, the scheduler 102 then determines if the job characteristic is new. In other words, the job scheduler 102 looks in a cache or memory to determine if these specific job node computational requirements have been previously encountered and analyzed. If the job characteristic is new, the job scheduler 102 initializes and records this job characteristic in the job scheduler 102 cache. From step 304, the job scheduler 102 proceeds to step 306 which is the same step that would be executed if the job characteristics are determined not to be new in step 302. In step 306, a node is selected for analysis to determine if the node has sufficient computational resources available to fulfill the computational node resource requirements of the job. That analysis is determined in step 308. If the node cannot be assigned to the job, in step 310, the job scheduler 102 determines if more nodes are available to the analyzed for assignment to the job in step 310. If so, the job scheduler 102 proceeds back to step 306 to start the analysis on the next selected node. If no more nodes are available in step 310, the job scheduler 102 determines that there are not enough resources for the job and designates that this job can not be executed or run in step 316 and ends this portion of the process in step 320. However, the job scheduler 102 determines that the node can be assigned to the job in step 308, the node is assigned in step 312 and in step 314, the job scheduler 102 determines if more nodes are required. If more nodes are required in step 314, the job scheduler 102 proceeds to step 310 to determine if more nodes are available to be analyzed. If no more nodes are required in step 314, the job scheduler 102 proceeds to step 318 to designate the job selection complete and end this portion of the process in step 320.

One of the key advantages of the present invention is its ability to use a record or history of previous job characteristics and node assignments to speed the process of determining when a node is available to be assigned a job.

Figure 4:
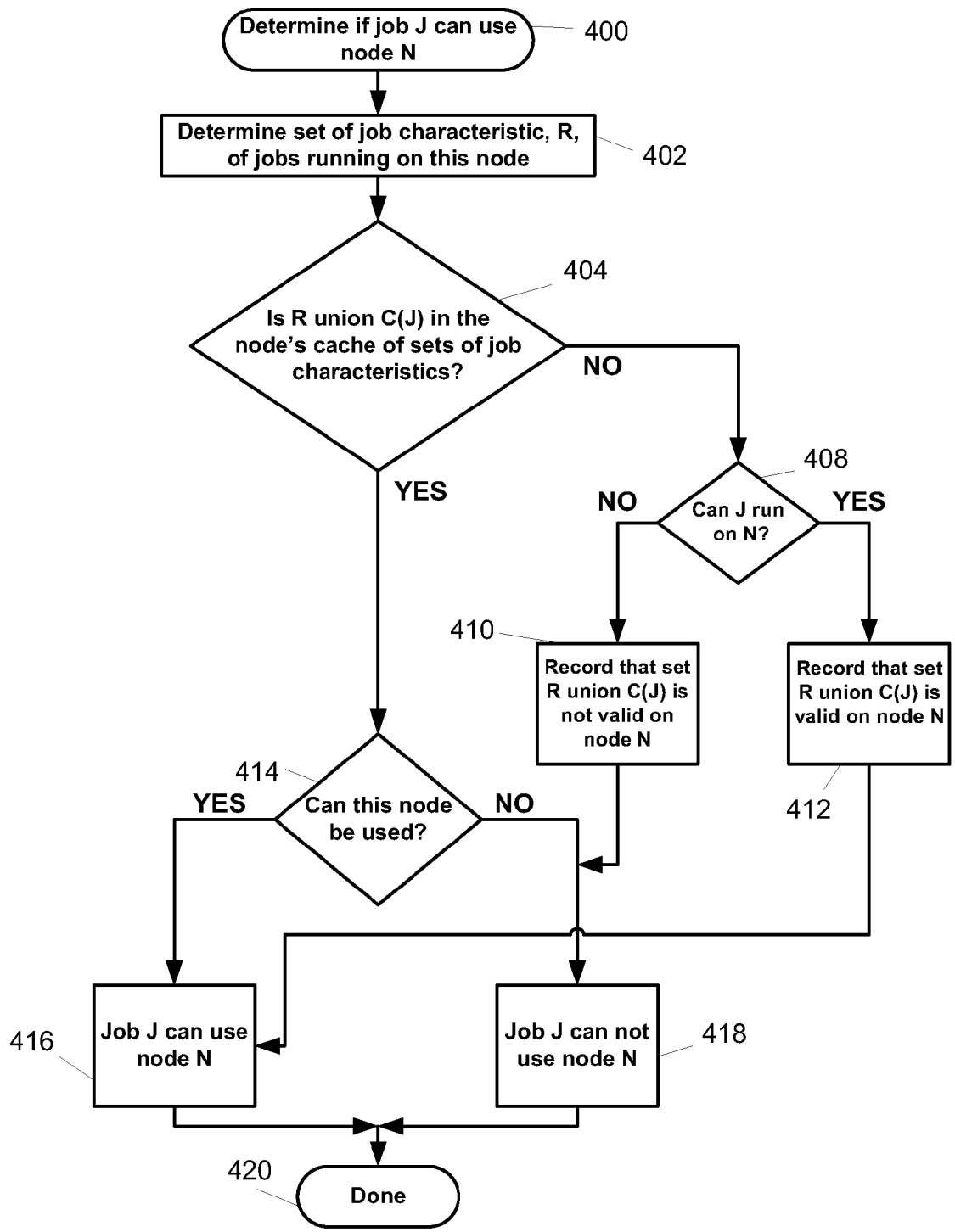
FIG. 4 is flow chart illustrating the function of using job characteristics for selecting a computational node to perform the job.

FIG. 4 illustrates in more detail how the determination is made as to whether or not nodes can be assigned to jobs. In step 400, the job scheduler 102 starts the process to determine if a specific node can be assigned to the job. The job characteristic is examined in step 402. As discussed previously, this job characteristic includes all the computational resource requirements for a node.

The job scheduler 102, in step 404, determines if the combination of new job's job characteristic, together with the job characteristics of the jobs currently executing on the node has been previously recorded. If it has, the job scheduler 102 proceeds to decision step 414. Otherwise, the job scheduler 102 proceeds to decision step 408.

In decision step 408, the job scheduler 102 determines if this node can be assigned to the job. The job scheduler determines the computational resources available on this node. The available computational resources are total computational resources of the node minus the computational resources that are consumed by jobs that are currently running on the node. The job scheduler determines whether the node has enough available computational resources to satisfy the new job's computational resource requirements. If so, the node can be assigned to the new job.

If it is determined that the node can be assigned to the job then, in step 412, the job scheduler 102 records in the job scheduler cache for the node that the job characteristic of the new job along with job characteristics of the currently executing jobs for that node can be executed successfully by the node. The job scheduler 102 proceeds to step 416 to assign the node to the job. However, if in step 408, it is determined that the node can not be assigned, job scheduler 103 proceeds to step 410 to record that this combination of the new job characteristic from the present job along with the job characteristics of jobs that are already running on the node result in this node not being able to perform this job. The job scheduler 102 then proceeds to step 418 to designate that this node cannot be used on this job. It should be understood that this computational resource analysis of the node can be very time consuming. Therefore, in step 406, if the job scheduler 102 finds a record or history containing the job characteristic of the new job in along with the job characteristics of jobs currently running on this node, the job scheduler 102 does not have to analyze further and can make a quick determination as to whether or not the node can be assigned. This greatly increases the efficiency of the job scheduling process.

Therefore accessing a record in cache to make this quick determination is much faster than the node analysis that must take place if there is no record. When one considers a typical large computer system with many nodes, the complexity of these nodes and the many jobs to be scheduled, it is apparent that the present invention greatly increases the overall efficiency of job scheduling and supercomputer performance.

As an example, understanding that the following is a greatly simplified description of computational resources, a computer system consists of 16 nodes where each node includes 8 CPUs and 1 gigabyte of memory. The first job is loaded from the job queue 100 that has a node requirement of 16 nodes with a job characteristic of 4 CPUs per node and 500 megabytes of memory per node. The first job is assigned 16 nodes by the job scheduler 102. A second job is loaded that requires 8 nodes with a job characteristic of 4 CPUs per node and 500 megabytes of memory per node. The job scheduler 102 must determine if 8 of the nodes have sufficient computational resources available to run the second job in parallel. Obviously, in this example, each of these nodes will have 4 CPUs and 500 megabytes of memory available and the second job can be assigned these nodes. However, if instead of this second job being received, a third job was received that included a job characteristic of 6 CPUs then the third job could not be assigned to any nodes until the first job was complete. The present invention speeds any subsequent analysis by, in this simplistic example, the job scheduler recording that the first job was successfully assigned and that the second job was successfully assigned. Then the next time a first job and second job combination is encountered, the job scheduler, from its records, quickly determines that this combination of jobs can be run and that the combination of the first job and the third job cannot be run. While this example is simple, for a node having many job characteristics in a supercomputer having many nodes and many jobs to dispatch, it can be appreciated that this invention will greatly increase the job scheduling efficiency and the efficiency of the supercomputer.

Another aspect of this present invention is, before jobs are scheduled, performing a categorization or pre-definition of the job characteristics of jobs that are to be scheduled. This approach takes advantage of an observation that in many typical supercomputing environments, there is a consistent workload that is processed, which is comprised of a finite set of unique job types. These unique job types or pre-defined job characteristics together with a set of nodes in the supercomputer are analyzed to provide a "pre-schedule" that provides a set of possible combinations of pre-defined job characteristics, for each node, that can run on that node. For each distinct node, the first phase determines which pre-defined job characteristics can coexist on that node.

For another example, consider the following:
Node N1 has 4 CPUs, allows exclusive/shared use, and has 512 mb of real memory.
Pre-defined job characteristic JC1 requires 2 CPUs, 128 mb of real memory, shared use.
Pre-defined job characteristic JC2 requires 1 CPUs, 256 mb of real memory, shared use.
Pre-defined job characteristic JC3 requires 2 CPUs, 256 mb of real memory, exclusive use.
Then, N1 can run the following jobs:
{JC1}, {JC2}, {JC3}, {JC1, JC1}, {JC1, JC2}

In actual situations as discussed above, the number of distinct resources per node is much greater and checking whether a particular computation resource requirement can be met often requires computation to determine that a job can be assigned.

The second phase of the pre-definition method selects nodes for jobs with the aid of the pre-schedule records of the first phase. In this phase, for given a job, the nodes will be selected. In order to check whether the job with job characteristic JC can use a given node, a set of jobs that are currently using this node is determined. Then, it is determined whether the new job characteristic in combination with the previously assigned and running job characteristics are in the pre-schedule record for the node, then this node can be selected for the job or not based of the pre-schedule record.

Take the example from above that {JC1} is presently running on the node. If this node is being selected for job of characteristic JC1, since {JC1, JC1} is part of the pre-schedule record for this node, then this node can be selected for this job. If, on the other hand, it is being selected for job of characteristic JC3, since {JC1, JC3} is not part of the pre-schedule record for this node, then this node can not be selected for this job.

The pre-definition phase is expensive, since computing the pre-schedule record requires a search over exponential number of possibilities, which arise due to the fact that it is necessary to compute the possible subsets of the set of pre-defined job characteristics that can run on a given distinct node. The number of subsets of a set is exponential, and thus this phase has at least an exponential running time. However, due to availability of the pre-schedule, the node selection phase is able to select nodes for jobs much faster. The node selection phase needs only to lookup the job characteristic subset in the pre-schedule record that would arise from selecting the node for the job. The pre-definition phase is executed only once, whereas node selection second phase is executed for each job. When the number of jobs is large, the benefits of this method become apparent. A large upfront cost will be offset by the savings that keep increasing with each new job.

Another aspect of the present invention is directed to cache record management. During the performance of job assignments to nodes by the job scheduler 102, the number of records can become quite large. In this case, the job scheduler can assign expiration times to these records and periodically scan the cache for expired records which can be removed. By adjusting the periods for expiration, the job scheduler can efficiently manage the cache memory resource.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method for dispatching jobs from a job queue in a data processing system having a plurality of computational nodes, the method comprising the steps of:

for each job, determining a number of nodes required and computational resource requirements for each node from scheduler records containing job characteristics for each job detailing nodes required for successful execution of the job and computations resource requirements for each node such as a number of CPUs in the node, an amount of node memory and/or memory restrictions for that node;

for each node required, selecting an available node and determining from the scheduler records further containing a combination of job characteristics that can be concurrently executed successfully by that node whether the node can be assigned to the job being currently dispatched wherein the combination of job characteristics that can be concurrently executed successfully by that node include the computer resources available such as number of CPUs, amount of node memory and/or memory restrictions for that node when other jobs are being concurrently executed on that node, and if no scheduler record exists;

analyzing whether the node can be assigned to the job being dispatched based upon the computational resources required by the job being dispatched and any computational resources required by jobs currently executing in the node to determine if the job being dispatched can be concurrently executed by the node while the other jobs assigned to the node are being executed, and assigning the node to the job if the computational resource requirements are met or selecting the next available node if this node does not meet the computational requirements while recording the results of such analysis of the node in the scheduler records; and determining when the number of nodes required is met and, if so, dispatching the job to the assigned nodes for execution, or, if the number of nodes required is not met, designating that the job cannot be executed at this time.

2. A method according to claim 1 wherein node computational resources include a plurality of central processing units (CPUs) contained in the node.

3. A method according to claim 1 wherein the job scheduler records includes an expiration designation.

4. A computer program product stored in a computer non-transitory storage media, the computer non-transitory storage media containing instructions for execution by a computer, which, when executed by the computer, causes the computer to implement a method for dispatching jobs from a job queue in a data processing system having a plurality of computational nodes, the method comprising the steps of:

for each job to be dispatched, determining a number of nodes required and computational resource requirements of each node from scheduler records containing job characteristics for each job detailing nodes required for successful execution of the job and computations resource requirements for each node such as a number of CPUs in the node, an amount of node memory and/or memory restrictions for that node;

for each node required, selecting an available node and determining from the scheduler records further containing a combination of job characteristics that can be concurrently executed successfully by that node whether the node can be assigned to the job being currently dispatched wherein the combination of job characteristics that can be concurrently executed successfully by that node include the computer resources available such as number of CPUs, amount of node memory and/or memory restrictions for that node when other jobs are being concurrently executed on that node, and if no scheduler record exists;

analyzing whether the node can be assigned to the job being dispatched based upon the computational resources required by the job being dispatched and any computational resources required by jobs currently executing in the node to determine if the job being dispatched can be concurrently executed by the node while the other jobs assigned to the node are being executed, and assigning the node to the job if the computational resource requirements are met or selecting a next available node if this node does not meet the computational requirements while recording the results of such analysis of the node in the scheduler records; and determining when the number of nodes required is met and, if so, dispatching the job to the assigned nodes for execution, or, if the number of nodes required is not met, designating that the job cannot be executed at this time.

5. A computer program product of claim 4 wherein the node computational resources include a plurality of central processing units (CPUs) contained in the node.

6. The computer program product of claim 4 wherein the scheduler records include an expiration designation.

7. The computer program product of claim 4 wherein the step of selecting an available node includes the steps of locating a scheduler record for that node and determining from that record if the node resource requirements for the job being dispatched and any node resources dedicated to the job currently running on the node exceed the computational resources of the node.

8. A method for dispatching jobs from a job queue in a data processing system having a plurality of computational nodes, the method comprising the steps of:

a) determining for each of a plurality of jobs, job characteristics which include a number or computational nodes required to execute the job and, for each node, computational resources required of that node;

b) determining for each of the plurality of nodes, the total computation resources of each node;

c) creating job scheduler records from steps a) and b) that indicate at least some combinations of job characteristics that can be executed simultaneously on each of the nodes;

d) for each job being dispatched, determining a number of nodes required and computational resource requirements for each node from the job scheduler records, wherein the computational resource requirements may include a number of CPUs in the node, an amount of node memory and/or memory restrictions for that node;

e) for each node required, selecting an available node and determining from the job scheduler records whether the node can be assigned to the job being currently dispatched wherein the job scheduler records contain a combination of job characteristics that can be concurrently executed successfully by that node and include the computer resources available such as number of CPUs, amount of node memory and/or memory restrictions for that node when other jobs are being concurrently executed on that node, and if no job scheduler records exist;

f) analyzing whether the node can be assigned to the job being dispatched based upon the computational resources required by the job being dispatched and any computational resources required by jobs currently executing in the node to determine if the job being dispatched can be concurrently executed by the node while the other jobs assigned to the node are being executed and assigning the node to the job if the computational resource requirements are met or selecting a next available node if this node does not meet the computational requirements while recording the results of this analysis in the job scheduler records until determining when the number of nodes required is met and, if so, dispatching the job to the assigned nodes for execution, or, if the number of nodes required is not met, designating that the job cannot be executed at this time.

9. A data processing system comprising:

a job scheduler node including at least one central processing unit connected to a memory including a job scheduling program for distributing a plurality jobs stored in a job queue in the memory;

a plurality of computational nodes, each including node computation resources including at least one central processing unit connected to a memory capable of storing programs and data;

a network interconnecting the job scheduler node and the plurality of computational nodes; and wherein the job scheduling program includes a job dispatch method for dispatching jobs from the job queue to assigned ones of the plurality of computational nodes, the job dispatch method including the steps of:

for each job, determining a number of nodes required and computational resource requirements for each node from scheduler records containing job characteristics for each job detailing nodes required for successful execution of the job and computations resource requirements for each node such as a number of CPUs in the node, an amount of node memory and/or memory restrictions for that node;

for each node required, selecting an available node and determining from the scheduler records, further containing a combination of job characteristics that can be concurrently executed successfully by that node, whether that node can be assigned to the job being currently dispatched wherein the combination of job characteristics that can be concurrently executed successfully by that node include the computer resources available such as number of CPUs, amount of node memory and/or memory restrictions for that node when other jobs are being concurrently executed on that node, and if no scheduler record exist;

analyzing whether that node can be assigned to the job being dispatched based upon the computational resources required by the job being dispatched and any computational resources required by jobs currently executing in the node to determine if the job being dispatched can be concurrently executed by the node while the other jobs assigned to the node are being executed and assigning the node to the job if the computational resource requirements are met or selecting a next available node if this node does not meet the computational requirements while recording the results of this analysis in the job scheduler records until determining when the number of nodes required is met and, if so, dispatching the job to the assigned nodes for execution, or, if the number of nodes required is not met, designating that the job cannot be executed at this time.

10. An data processing system according to claim 9 wherein the scheduler records including an expiration designation.

11. An data processing system according to claim 9 wherein the job dispatch method step of selecting an available node includes the steps of locating a scheduler record for that node and determining from that record if the combination of the node resource requirements for the job being dispatched and any node resources dedicated to the job currently running on the node indicate whether the node can be assigned to the job being dispatched.

* * * * *